(12) United States Patent
Seo

(10) Patent No.: US 11,589,012 B2
(45) Date of Patent: Feb. 21, 2023

(54) IMAGE RECORDING DEVICE AND VEHICLE HAVING THE SAME

(71) Applicants: Hyundai Motor Company, Seoul (KR); Kia Corporation, Seoul (KR)

(72) Inventor: Jaiwon Seo, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/452,314

(22) Filed: Oct. 26, 2021

(65) Prior Publication Data

US 2022/0321838 A1 Oct. 6, 2022

(30) Foreign Application Priority Data

Mar. 31, 2021 (KR) .................. 10-2021-0042117

(51) Int. Cl.
*H04N 7/18* (2006.01)
*B60R 21/0132* (2006.01)
*G08G 1/16* (2006.01)

(52) U.S. Cl.
CPC .......... *H04N 7/183* (2013.01); *B60R 21/0132* (2013.01); *G08G 1/164* (2013.01); *H04N 7/188* (2013.01)

(58) Field of Classification Search
CPC .... H04N 7/183; H04N 7/188; B60R 21/0132; G08G 1/164
See application file for complete search history.

(56) References Cited

U.S. PATENT DOCUMENTS

| | | | |
|---|---|---|---|
| 2009/0273672 A1* | 11/2009 | Koudritski | B60R 25/1004 348/148 |
| 2012/0310484 A1* | 12/2012 | Higuchi | B60R 21/0132 701/1 |
| 2014/0195070 A1* | 7/2014 | Shimizu | G07C 5/0841 701/1 |
| 2018/0111574 A1* | 4/2018 | Okamura | B60R 21/0132 |
| 2021/0086763 A1* | 3/2021 | Albinsson | G05D 1/0223 |
| 2021/0146866 A1* | 5/2021 | Klein | H04W 4/40 |

FOREIGN PATENT DOCUMENTS

| KR | 20200071218 A | 6/2020 |
|---|---|---|
| KR | 102164334 B1 | 10/2020 |

* cited by examiner

*Primary Examiner* — Michael Lee
(74) *Attorney, Agent, or Firm* — Slater Matsil, LLP

(57) ABSTRACT

An embodiment image recording device includes an image obtainer configured to obtain image information, a first sensor configured to detect first impact information, a communicator configured to receive second impact information transmitted from another device, and to communicate with a terminal, a controller configured to determine whether an impact has been applied to a side of a vehicle based on the first impact information and the second impact information, and in response to a determination that the impact has been applied to the side of the vehicle, to control the communicator to transmit the image information obtained by the image obtainer to the terminal, and a storage device configured to store the image information and event information in response to a control command from the controller.

18 Claims, 8 Drawing Sheets

1

IMAGE RECORDING DEVICE AND VEHICLE HAVING THE SAME

CROSS-REFERENCE TO RELATED APPLICATIONS

This application claims the benefit of Korean Patent Application No. 10-2021-0042117, filed on Mar. 31, 2021, which application is hereby incorporated herein by reference.

TECHNICAL FIELD

The present disclosure relates to an image recording device and a vehicle having the image recording device.

BACKGROUND

A vehicle performs additional functions for user convenience, such as a radio broadcasting function, an audio play function, a video play function, a navigation function, an air-conditioning function, a seat heater control function, an image recording function (black box function), a function of communicating with external user terminals, etc., in addition to a driving function.

The image recording function among the functions includes a function of obtaining rear images during parking and a function of obtaining front images during driving. That is, the vehicle obtains rear images and displays the rear images during parking to perform a parking assist function, and obtains front images and stores the front images during driving in order to use, when an accident occurs, the front images to analyze a cause of the accident. Also, when the vehicle has an autonomous driving function, the vehicle uses the obtained front images as information for autonomous driving.

The image recording function performs an operation of recording images when an impact is applied to a parked or stopped vehicle to obtain information about another vehicle or person which applies the impact to the vehicle.

For example, recently, due to an increase in number of vehicles and narrow parking spaces, collisions between vehicles often occur, and particularly, cases in which the door of a vehicle is damaged by a collision with the door of another vehicle being adjacent to the vehicle when the door opens happen frequently. In these cases, the owner of the other vehicle that has damaged the vehicle should compensate the owner of the vehicle. However, situations in which the owner of the other vehicle does not compensate or runs away without leaving his/her number happen frequently.

Accordingly, a vehicle performs the image recording function of sensing an impact applied to the vehicle during parking or stopping and recording information related to the sensed impact as images.

However, as such image recording functions increase and situations in which images need to be recorded to correspond to impact sensing happen frequently, a memory capacity for storing image data increases, which raises manufacturing cost.

SUMMARY

The present disclosure relates to an image recording device and a vehicle having the image recording device. Particular embodiments relate to an image recording device for recording an image of surroundings in response to occurrence of an impact, and a vehicle having the image recording device.

Therefore, an embodiment of the present disclosure provides an image recording device for recognizing an impact which may cause damage from among applied impacts and recording an image about the recognized impact, and a vehicle having the image recording device.

Another embodiment of the present disclosure provides an image recording device for recognizing an impact by using information sensed by a sensor provided in another device, and a vehicle having the image recording device.

Additional embodiments of the disclosure will be set forth in part in the description which follows and, in part, will be obvious from the description, or may be learned by practice of the disclosure.

In accordance with one embodiment of the present disclosure, an image recording device includes an image obtainer, a first sensor configured to detect first impact information, a communicator configured to receive second impact information transmitted from another device, and communicate with a terminal, a controller configured to determine whether an impact has been applied to a side of a vehicle, based on the first impact information and the second impact information, and control, when it is determined that the impact has been applied to the side of the vehicle, the communicator to transmit image information obtained by the image obtainer to the terminal, and a storage device storing the image information and event information in response to a control command from the controller.

The first sensor of the image recording device according to an embodiment may include an acceleration sensor, and the second impact information may include at least one of pressure information detected by a second sensor provided in an airbag system and acceleration information detected by a third sensor provided in the airbag system.

The controller of the image recording device according to an embodiment may primarily determine whether the impact has been applied to the side of the vehicle, based on impact information detected by the first sensor, and, when the controller primarily determines that the impact has been applied to the side of the vehicle, the controller may secondarily determine whether the impact has been applied to the side of the vehicle, based on at least one of the pressure information detected by the second sensor and the acceleration information detected by the third sensor.

The controller of the image recording device according to an embodiment may control activation of the image obtainer when the controller determines that the impact has been applied to the side of the vehicle.

In accordance with another embodiment of the present disclosure, a vehicle includes a plurality of doors, an image obtainer, a first sensor for detecting acceleration, an airbag system including at least one sensor of a second sensor for detecting pressure by an impact and a third sensor for detecting acceleration by the impact, the airbag system configured to control deployment of an airbag portion in correspondence to the impact, and an image recording device configured to record an image obtained by the image obtainer, wherein the image recording device is configured to determine whether an impact has been applied to at least one door of the plurality of doors based on detection information detected by the first sensor, the second sensor, and the third sensor upon ignition off, store image information obtained by the image obtainer when the image recording device determines that the impact has been applied to the at least one door, and transmit the image information to an external terminal.

The airbag portion of the vehicle according to another embodiment may include a side airbag portion installed in an interior and positioned adjacent to the plurality of doors, the second sensor may be positioned adjacent to a driver seat door and a passenger seat door among the plurality of doors, and the third sensor may be positioned between a front door and a rear door among the plurality of doors and located inside B pillars respectively provided at left and right sides of a body of the vehicle.

The first sensor of the vehicle according to another embodiment may be positioned inside a hood of the body or a dashboard of the body.

The image recording device of the vehicle according to another embodiment may primarily determine whether an impact has been applied to the at least one door, based on acceleration information about acceleration detected by the first sensor, and the image recording device may secondarily determine, when the image recording device primarily determines that the impact has been applied to the at least one door, whether the impact has been applied to the at least one door, based on at least one of pressure information of the second sensor and acceleration information of the third sensor.

The image obtainer of the vehicle according to another embodiment may include a first camera for obtaining a front image, a second camera for obtaining a rear image, a third camera for obtaining a left image, and a fourth camera for obtaining a right image, and the image recording device may control activation of the first camera, the second camera, the third camera, and the fourth camera when it is determined that an impact has been applied to the at least one door.

The image obtainer of the vehicle according to another embodiment may include a first camera for obtaining a front image, a second camera for obtaining a rear image, a third camera for obtaining a left image, and a fourth camera for obtaining a right image, and the image recording device may store, when it is determined that an impact has been applied to the at least one door, an image obtained for a preset period from a time at which the impact has been applied, as an event image, and transmit the stored event image to the external terminal.

The airbag system of the vehicle according to another embodiment may set, upon driving, reference pressure information corresponding to the second sensor to first reference pressure information and set reference acceleration information corresponding to the third sensor to first reference acceleration information, and the image recording device may set, upon ignition off, reference pressure information corresponding to the second sensor to second reference pressure information and reference acceleration information corresponding to the third sensor to second reference acceleration information.

The vehicle according to another embodiment may further include a battery for supplying power to the image recording device and the second sensor and the third sensor positioned in the airbag system upon ignition off.

The vehicle according to another embodiment may further include a tail gate and a fourth sensor positioned in the tail gate to detect acceleration by an impact applied to the tail gate.

The plurality of doors of the vehicle according to another embodiment may include a rear door positioned adjacent to a back seat, and the vehicle may further include a fifth sensor positioned in the rear door to detect acceleration by an impact applied to the rear door.

The image recording device of the vehicle according to another embodiment may determine whether at least one door of the plurality of doors has opened, determine whether detection information detected by the first sensor, the second sensor, and the third sensor is information corresponding to opening/closing of the at least one door, based on a determination on whether the at least one door has opened, and control deactivation of the image obtainer when it is determined that the detection information detected by the first sensor, the second sensor, and the third sensor is the information corresponding to opening/closing of the at least one door.

In accordance with another embodiment of the present disclosure, a vehicle includes a communicator configured to communicate with an external terminal, a plurality of doors, an image obtainer, a first sensor configured to detect acceleration, an airbag system including a third sensor for detecting acceleration by an impact, the airbag system configured to control deployment of the airbag portion in correspondence to the impact, an image recording device configured to record an image obtained by the image obtainer, and a battery supplying power to the image recording device and the third sensor positioned in the airbag system upon ignition off, wherein the image recording device is further configured to determine whether an impact has been applied to at least one door of the plurality of doors based on detection information detected by the first sensor and the third sensor upon ignition off, store image information obtained by the image obtainer when the image recording device determines that the impact has been applied to the at least one door, and transmit the image information to an external terminal.

The image recording device of the vehicle according to another embodiment may determine whether at least one door of the plurality of doors has opened, determine whether detection information detected by the first sensor and the third sensor is information corresponding to opening/closing of the at least one door based on a determination on whether the at least one door has opened, and control deactivation of the image obtainer when the image recording device determines that the detection information detected by the first sensor and the third sensor is the information corresponding to opening/closing of the at least one door.

The vehicle according to another embodiment may further include a tail gate and a fourth sensor positioned in the tail gate and configured to detect acceleration by an impact applied to the tail gate.

The plurality of doors of the vehicle according to another embodiment may include a rear door positioned adjacent to a back seat, and the vehicle may further include a fifth sensor positioned in the rear door to detect acceleration by an impact applied to the rear door.

The image obtainer of the vehicle according to another embodiment may include a first camera for obtaining a front image, a second camera for obtaining a rear image, a third camera for obtaining a left image, and a fourth camera for obtaining a right image, and the image recording device may store, when it is determined that an impact has been applied to the at least one door, an image obtained for a preset period from a time at which the impact has been applied, as an event image, and transmit the stored event image to the external terminal.

The airbag system of the vehicle according to another embodiment may set, during driving, reference acceleration information corresponding to the third sensor to first reference acceleration information, and the image recording device may set, upon ignition off, reference acceleration information corresponding to the third sensor to second reference acceleration information.

BRIEF DESCRIPTION OF THE DRAWINGS

These and/or other embodiments of the disclosure will become apparent and more readily appreciated from the following description of exemplary embodiments, taken in conjunction with the accompanying drawings, in which.

DETAILED DESCRIPTION OF ILLUSTRATIVE EMBODIMENTS

Figure 1:
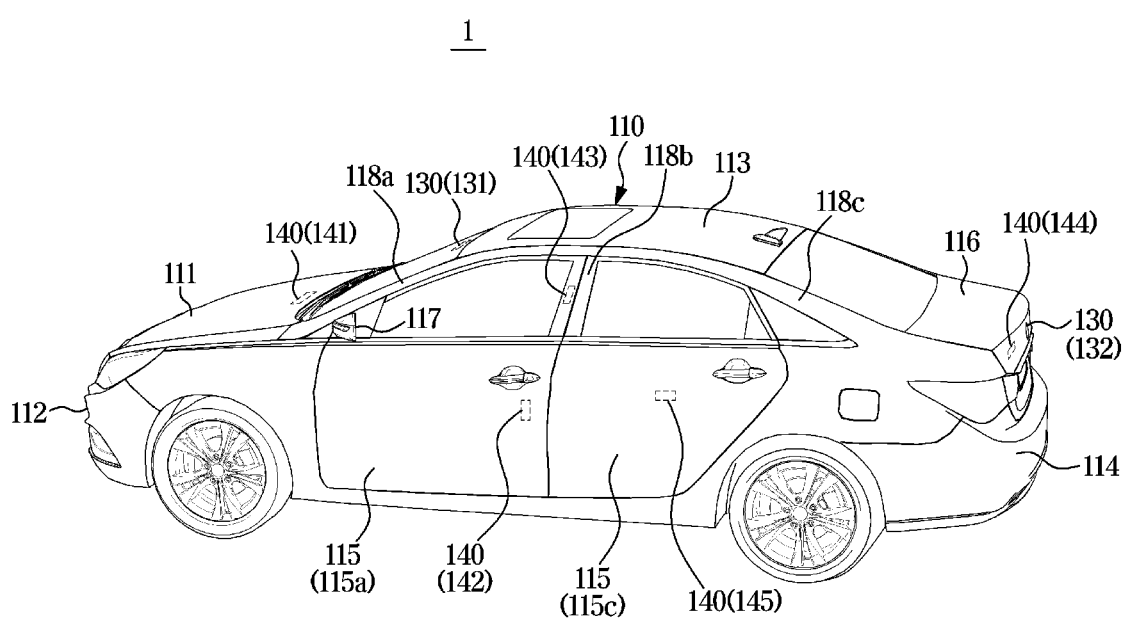
FIG. 1 illustrates an example of an outer appearance of a vehicle according to an embodiment.

Like numbers refer to like elements throughout this specification. This specification does not describe all components of embodiments, and general information in the technical field to which the disclosure belongs or overlapping information between the embodiments will not be described. The terms "part", "module", "member", and "block", as used herein, may be implemented as software or hardware, and according to embodiments, a plurality of "parts", "modules", "members", or "blocks" may be implemented as a single component, or a single "part", "module", "member", or "block" may include a plurality of components.

Throughout this specification, when a part is "connected" to another part, this includes the case in which the part is indirectly connected to the other part, as well as the case in which the part is directly connected to the other part, and the indirect connection includes a connection through a wireless communication network.

Also, it will be understood that the terms "includes," "comprises," "including," and/or "comprising," when used in this specification, specify the presence of a stated component, but do not preclude the presence or addition of one or more other components.

It will be understood that, although the terms first, second, etc. may be used herein to describe various components, these components should not be limited by these terms. These terms are only used to distinguish one component from another.

It is to be understood that the singular forms "a," "an," and "the" include plural referents unless the context clearly dictates otherwise.

Reference numerals used in operations are provided for convenience of description, without describing the order of the operations, and the operations can be executed in a different order from the stated order unless a specific order is definitely specified in the context.

Hereinafter, the operation principle and embodiments of the disclosure will be described with reference to the accompanying drawings.

Figure 2:
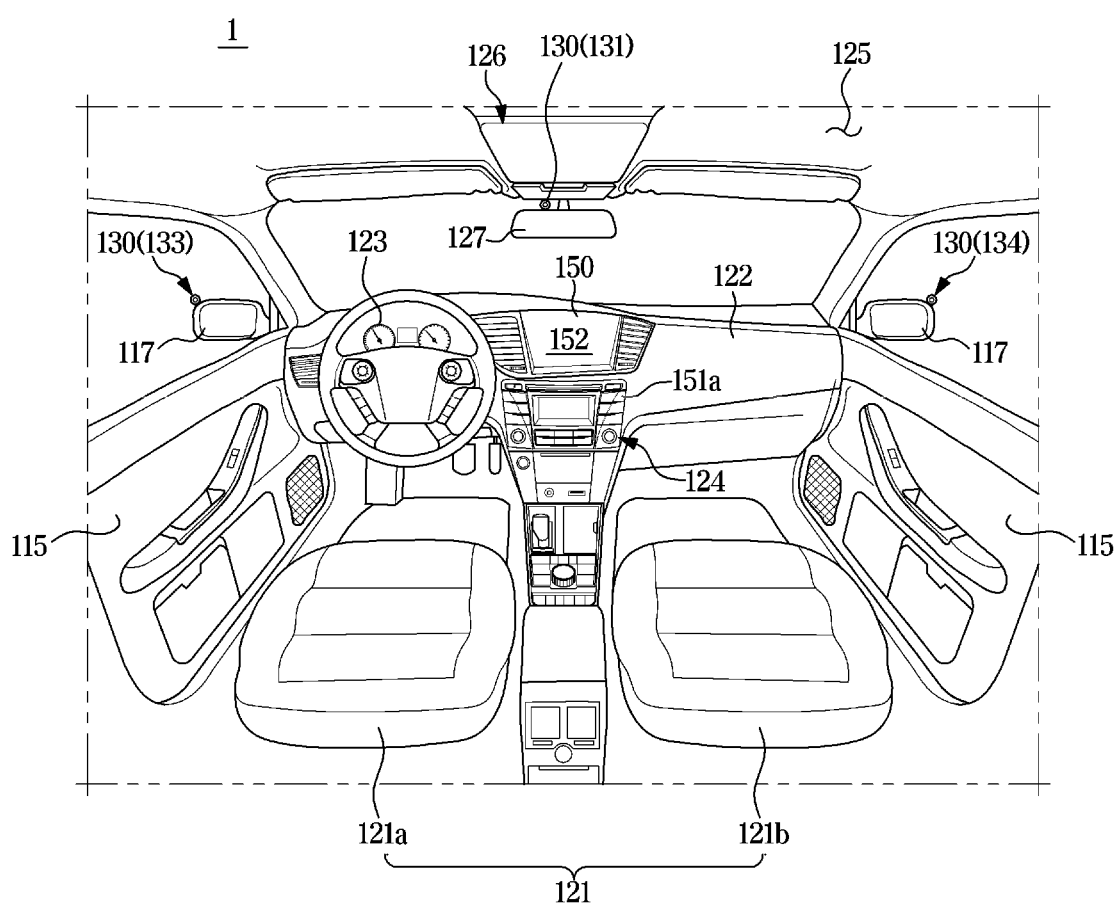
FIG. 2 illustrates an example of an interior of a vehicle according to an embodiment.
Figure 3:
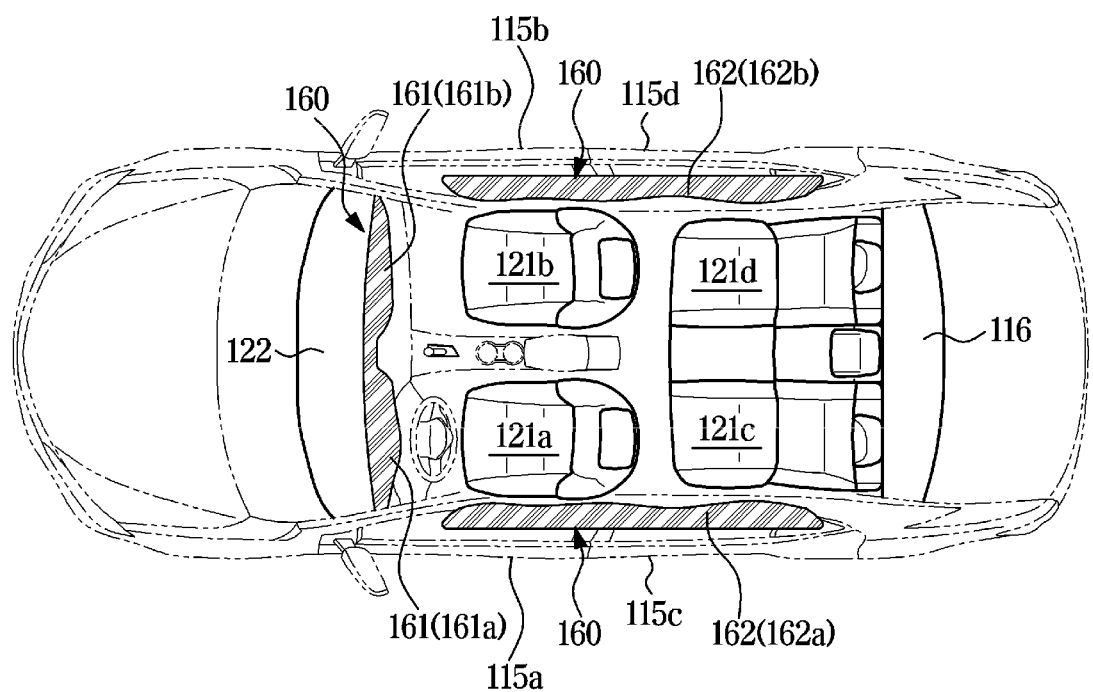
FIG. 3 illustrates an example of an airbag system provided in a vehicle according to an embodiment.

FIG. 1 illustrates an example of an outer appearance of a vehicle according to an embodiment, FIG. 2 illustrates an example of an interior of a vehicle according to an embodiment, and FIG. 3 illustrates an example of an airbag system provided in a vehicle according to an embodiment.

As illustrated in FIG. 1, a vehicle 1 may include a body no having an exterior and an interior, and a chassis which is the remaining portion except for the body 110 and in which machine devices required for driving are installed.

The exterior of the body no may include a front panel 111, a hood 112, a roof panel 113, a rear panel 114, a plurality of left and right doors 115 for opening or closing an inside space in which persons can sit, and a plurality of window glasses respectively installed in the plurality of left and right doors 115.

The plurality of window glasses may include a side window glass, a quarter window glass installed between pillars wherein the quarter window glass does not open, a rear window glass installed in a rear portion of the body no, and a front window glass installed in a front portion of the body no.

The vehicle 1 may include a tail gate 116 for opening or closing a trunk forming a space for storing baggage, and a plurality of left and right side mirrors 117 providing a driver with rear views.

The vehicle 1 may include a plurality of left and right A pillars 118a provided in the front window glass and positioned at a border with the door 115 of a front seat, a plurality of left and right B pillars 118b positioned at a border between the door 115 of the front seat and the door 115 of a back seat, and a plurality of left and right C pillars 118c provided in the rear window glass and positioned at a border with the door 115 of the back seat.

The vehicle 1 may further include an image obtainer 130 for obtaining surrounding images.

The image obtainer 130, which is a camera, may include a charge coupled device (CCD) imaging sensor or a complementary metal-oxide semiconductor (CMOS) imaging sensor. Also, the image obtainer 130 may include a three-dimensional (3D) space sensor, such as KINECT (RGB-D sensor), TOF (time of flight) sensor, and a stereo camera. The image obtainer 130 may include at least one rotatable camera. The image obtainer 130 may include a camera of a surround view monitor (SVM) or automatic vehicle monitoring (AVM) system, or may include a camera of a blind spot detection (BSD) device or a camera of a rear detection device. Each camera of the image obtainer 130 may be a wide angle camera.

The image obtainer 130 may include a plurality of cameras for obtaining images captured in front, rear, left, and right directions of the vehicle 1, that is, images captured in different directions. The plurality of cameras may have different viewing angles.

The image obtainer 130 of the vehicle 1 may include a first camera 131 for obtaining images captured in the front direction of the vehicle 1, a second camera 132 for obtaining images captured in the rear direction of the vehicle 1, a third camera 133 for obtaining images captured in the left direction of the vehicle 1, and a fourth camera 134 for obtaining images captured in the right direction of the vehicle 1.

The first camera 131 may be provided on an inner side of the front window glass located in the front portion of the vehicle 1 in such a way as to face outside of the vehicle 1, or the first camera 131 may be provided on a room mirror inside the vehicle 1 in such a way as to face the outside of the vehicle 1. Also, the first camera 131 may be provided on a license plate of the front panel 111, a grille, an emblem, the front panel 111, or the roof panel 113 in such a way as to be exposed to the outside.

The second camera 132 may be provided on an inner side of the rear window glass located in the rear portion of the vehicle 1 in such a way as to face the outside of the vehicle 1, or the second camera 132 may be provided on the tail gate 116, a license plate of the rear panel 114, the roof panel 113, the rear panel 114, or an emblem in such a way as to be exposed to the outside.

The first camera 131, which is a front camera, may include a camera provided in a black box, a camera of an autonomous driving control device for autonomous driving, and a camera for detecting obstacles.

The second camera 132, which is a rear camera, may be a parking assistant camera. The third and fourth cameras 133 and 134 may be blind spot monitoring cameras.

The third camera 133 may be provided on the left side mirror 117 or a left fender, and the fourth camera 134 may be provided on the right side mirror 117 or a right fender.

The vehicle 1 may further include a detector 140 for detecting an impact applied to the vehicle 1 and the strength of the impact.

The detector 140 of the vehicle 1 may further include a first sensor 141 provided in the inside of the front panel 111 or a dashboard, a second sensor 142 provided in the left and right doors 115 of the vehicle 1, and a third sensor 143 provided in each of the left and right B pillars 118*b* of the vehicle 1, and the detector 140 may further include a fourth sensor 144 provided in the tail gate 116 and a fifth sensor 145 provided in each of the rear doors 115 of the vehicle 1.

The first sensor 141 may be an acceleration sensor for sensing acceleration of the vehicle 1.

The first sensor 141 may be an acceleration sensor for sensing an impact applied to the front portion of the vehicle 1 from the front.

The second sensor 142 and the third sensor 143 may be sensors for sensing an impact applied to the vehicle 1 to determine whether to deploy an airbag. The second sensor 142 may be a pressure sensor for sensing pressure applied to a side of the vehicle 1, and the third sensor 143 may be an acceleration sensor for sensing an impact applied to a side of the vehicle 1. The side of the vehicle 1 may be one of the doors 115 of the vehicle 1.

The fourth sensor 144 may be an acceleration sensor for sensing an impact applied to the rear portion of the vehicle 1 from behind.

The fifth sensor 145 may be an acceleration sensor provided in a rear door 115*c* to sense an impact applied to the rear door 115*c*.

As illustrated in FIG. 2, the interior of the vehicle 1 may include a plurality of seats 121 (121*a* and 121*b*) in which passengers sit, a dashboard 122, a cluster (that is, an instrument panel) 123 which is disposed on the dashboard 122 and guides driving functions and vehicle information, such as vehicle speed, the rpm of an engine, an oil flow, a coolant, etc., a head unit 124 being adjacent to the dashboard 122 to control an audio system, an air conditioner, a Bluetooth device, seat heat wires, etc., a head lining 125 provided above the doors 115 and forming an interior of a ceiling, an overhead console 126 provided in the head lining 125, and a room mirror 127 provided in the head lining 125 to show rear views.

The vehicle 1 may further include a vehicle terminal (audio video navigation (AVN)) 150 provided as an embedding type or a mounting type on the dashboard 122.

The vehicle terminal 150 may display an image about at least one function selected by a user from among an audio play function, a video play function, a navigation function, a digital multimedia broadcasting (DMB) function, a radio broadcasting function, a content play function, an internet search function, and an autonomous driving information display function.

The vehicle terminal 150 may be configured with a display panel. In this case, the vehicle terminal 150 may receive a selection of a button displayed on the display panel through an input device 151*a* provided inside the vehicle 1.

The input device 151*a* may be provided in at least one of a steering wheel, a head unit, and a center fascia, and may receive a command for turning on/off at least one function among a plurality of functions, a command for operating the at least one function, and information about setting values based on which the functions change their operation states. For example, the input device 151*a* may receive a command for executing at least one function among a radio broadcasting function, an audio play function, a video play function, a map display function, a navigation function, an autonomous driving function, a DMB function, a content play function, and an internet search function.

The input device 151*a* may be implemented as at least one of a physical button, a key, a switch, and a lever. The input device 151*a* may be implemented as a jog dial (not shown) or a touch pad (not shown) for inputting a movement command, a selection command, etc. of a cursor displayed on the vehicle terminal iso.

The input device 151*a* may receive a user input. For example, the input device 151*a* may receive a command for reproducing a recorded image, as a user input.

A display 152 of the vehicle terminal 150 may display operation information about a function being executed.

For example, the display 152 may display information related to a telephone call, information of content output through the vehicle terminal 150, information related to playing music, or external broadcasting information.

The display 152 may be a cathode ray tube (CRT), a digital light processing (DLP) panel, a plasma display panel (PDP), a light crystal display (LCD) panel, an electroluminescence (EL) panel, an electrophoretic display (EPD) panel, an electrochromic display (ECD) panel, a light emitting diode (LED) panel, or an organic light emitting diode (OLED) panel, although it is not limited to these.

As illustrated in FIG. 3, the vehicle 1 may include an airbag system 160.

The airbag system 160 may include a plurality of front airbag portions 161 provided in the dashboard 122 or in an area being adjacent to the dashboard 122, and a plurality of side airbag portions 162 provided in areas being adjacent to the doors 115.

The plurality of front airbag portions 161 may include a first front airbag portion 161*a* provided in an area of the dashboard 122, being adjacent to a driver seat 121*a*, and a second front airbag portion 161*b* provided in another area of the dashboard 122, being adjacent to a passenger seat 121*b*. The first front airbag portion 161*a* may be provided in the steering wheel.

The first front airbag portion 161*a* and the second front airbag portion 161*b* may include fixed type airbags.

The plurality of side airbag portions 162 may further include a first side airbag portion 162*a* provided in a panel between a door 115*a* being adjacent to the driver seat 121*a* and a door 115c being adjacent to a back seat 121c behind the driver seat ma, and a second side airbag portion 162b provided in a panel between a door 115b being adjacent to the passenger seat 121b and a door 115d being adjacent to a back seat 121d behind the passenger seat 121b.

The first side airbag portion 162a may be provided in a side area of the head lining 125, and extend from an area above the door 115a being adjacent to the driver seat 121a to an area above the door 115c being adjacent to the back seat 121c behind the driver seat 121a in the side area of the head lining 125.

The second side airbag portion 162b may be provided in another side area of the head lining 125, and extend from an area above the door 115b being adjacent to the passenger seat 121b to an area above the door 115d being adjacent to the back seat 121d behind the passenger seat 121b in the other side area of the head lining 125.

The first side airbag portion 162a and the second side airbag portion 162b may be curtain airbags.

The first side airbag portion 162a and the second side airbag portion 162b may include fixed type airbags.

The chassis of the vehicle 1 may be a frame supporting the body no, and may include a power generating system for applying a driving force, a braking force, and a steering force to front, rear, left and right wheels, a power transfer system, a brake system, and a steering system. The chassis may further include a suspension system, etc.

The power generating system may include an engine, a fuel device, a cooling device, a fueling device, etc. The power generating system may generate mechanical power by burning oil fuel, such as gasoline and diesel, and transfer the generated mechanical power to the power transfer system, etc.

The power transfer system may include at least one of a transmission, a clutch, a final reduction device, and a differential gear device.

Figure 4:
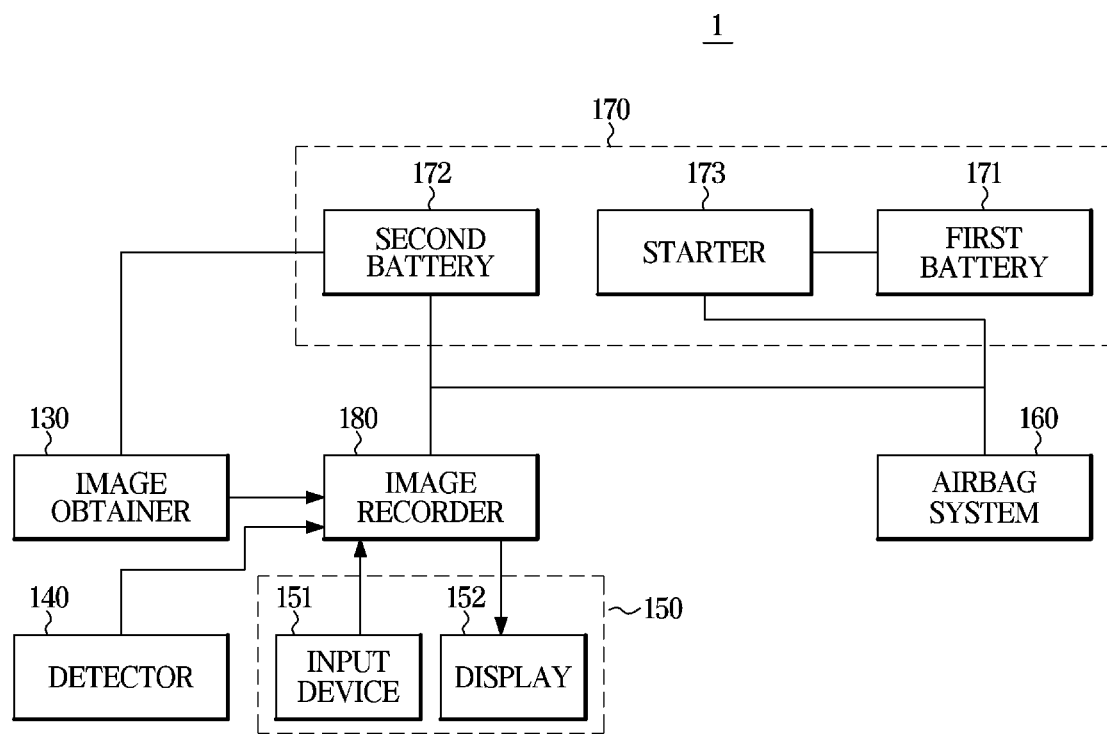
FIG. 4 is a control block diagram of a vehicle according to an embodiment.

FIG. 4 is a control block diagram of a vehicle according to an embodiment.

The vehicle 1 may include the image obtainer 130, the detector 140, the vehicle terminal 150, and the airbag system 160, and further include a power supply 170 and an image recording device 180.

The image obtainer 130 may obtain images of surroundings of the vehicle 1.

The image obtainer 130 may convert shape information about an object around the vehicle 1 into an electrical image signal, and transmit an image signal corresponding to shape information of an external environment of the vehicle 1 from a current location of the vehicle 1, more specifically, a road along which the vehicle 1 travels and objects located to the front, rear, left, and right of the vehicle 1 around the road, to the image recording device 180.

The detector 140 may detect an impact applied to the vehicle 1 and the strength of the impact, and transmit impact information about the detected impact to at least one of the image recording device 180 and the airbag system 160.

The detector 140 may include at least one of an acceleration sensor, a pressure sensor, a touch sensor, a force sensor, a limit switch, a proximity sensor, an Arduino shock sensor, a yaw rate sensor, and a vibration sensor. However, the detector 140 is not limited to the above-mentioned sensors.

The detector 140 may detect an impact applied to the front, rear, left, and right portions of the vehicle 1.

The detector 140 may include the first sensor 141 provided inside the hood 112 or the dashboard 122 to detect an impact applied to the front portion of the vehicle 1, and the second sensor 142 and the third sensor 143 provided in the airbag system 160 of the vehicle 1 to detect an impact applied to the vehicle 1 to determine whether to deploy an airbag.

The first sensor 141 may be an acceleration sensor provided in the airbag system 160 of the vehicle 1. The first sensor 141 may be an acceleration sensor for detecting acceleration information about driving of the vehicle 1.

The second sensor 142 may be provided in each of the left and right doors 115 to detect pressure applied to the left and right doors 115. The second sensor 142 may be a pressure sensor, and at least two second sensors 142 may be provided.

The third sensor 143 may be provided in each of the left and right B pillars 118b to detect an impact applied to the left and right doors 115. The third sensor 143 may be an acceleration sensor, and at least two third sensors 143 may be provided.

The detector 140 may further include the fourth sensor 144 including an acceleration sensor for detecting an impact applied to the tail gate 116 or the rear panel 114, and the fifth sensor 145 provided in each of the rear doors 115 to detect an impact applied to the rear doors 115. The fifth sensor 145 may be an acceleration sensor, and at least two fifth sensors 145 may be provided.

The vehicle terminal 150 may include the input device 151 and the display 152. Also, the vehicle terminal 150 may include only the display 152.

The vehicle terminal 150 may include a display panel as the display 152, and include a touch panel as the input device 151.

The vehicle terminal 150 may be implemented only with the display panel. In this case, the vehicle terminal 150 may receive a selection of a button displayed on the display panel through the input device 151a provided inside the vehicle 1.

The input device 151 of the vehicle terminal 150 and the input device 151a (see FIG. 2) of the vehicle 1 may receive a user input. Functions of the input device 151 of the vehicle terminal 150 may be the same as those of the input device 151a (see FIG. 2) of the vehicle 1, and the same functions will be described in regard of, as an example, the input device 151 of the vehicle terminal 150.

The input device 151 may receive a play command, a pause command, an end command, an image search command, etc. for a recorded image. The input device 151 may receive, when an image is searched or reproduced, at least one of time, place, and location information at which the image has been stored. The input devices 151 and Isla may receive an image deletion command.

The input device 151 may receive user phone number information, mail address information, and application information for notifying an impact. The application information may be user information registered by a user through member registration.

The input device 151 may receive recording time information about recording time of an image recording mode during parking or stopping. The recording time information may include always, event, manual, and time-lapse.

The always may be to record, when the image recording mode starts in response to a user command, images until an off command is received.

The event may be to record images in response to an impact applied to the vehicle 1, the manual may be to record, when a recording command is received according to a user command, images for a first period from a time at which the recording command is received, and the time-lapse may be to record images for a second period at preset time intervals.

The input device 151 may transmit recording time information input by the user to the image recording device 180.

The display 152 may display an image obtained by the image obtainer 130 in response to a user input and recorded.

The display 152 may display information about various functions that can be performed in the vehicle 1, information about various functions being performed in the vehicle 1, and information corresponding to a user input.

The display 152 may display an image stored in the first storage device 183 of the image recording device 180, in the form of an around-view image or a top-view image.

The airbag system 160 may control deployment of at least one airbag portion based on impact information received from at least one of the first, second, and third sensors 141, 142, and 143, and the airbag system 160 may also control deployment of at least one airbag portion based on impact information received from at least one of the fourth and fifth sensors 144 and 145.

The power supply 170 may be a device for supplying power to various electronic devices provided in the vehicle 1.

The power supply 170 may include a starter 173 for starting the engine, and a first battery 171 for supplying power to the starter 173 for starting the engine. That is, the vehicle 1 may operate the starter 173 with power of the first battery 171, and upon completion of ignition, the vehicle 1 may generate mechanical power by burning oil fuel, such as gasoline and diesel, and travel by using the mechanical power.

The starter 173 may operate the engine of the power generating system in response to reception of a start-on signal by a user input. The starter 173 may include a motor (that is, a starter motor) for starting the engine.

The starter motor may receive power from the first battery 171, be driven with the power, and transfer a rotational force generated by the driving to the engine to thereby start the engine. At this time, the starter motor may operate as a motor.

The starter motor may operate as a generator upon driving of the vehicle 1. At this time, the starter motor may be driven by a rotational force of the engine, generate power by using a rotational force generated by the driving, and charge the first battery 171 and a second battery 172 with the generated power.

Also, the starter motor may operate as a generator during driving of the vehicle 1 to supply generated power to various electronic devices provided in the vehicle 1.

The starter motor may be an alternator.

Also, the starter motor may be provided separately from an alternator.

The vehicle 1 may be an electric car. In this case, the vehicle 1 may include the first battery 171 for supplying power to a motor of wheels and the second battery 172 for supplying power to various electronic devices.

The first battery 171 may be a rechargeable battery.

Power charged in the first battery 171 may be used as power for starting the engine, power for converting a plurality of electronic devices to a sleep mode after ignition off, and power by dark current.

The first battery 171 may supply power to the airbag system 160, various detectors including the detector 140, the vehicle terminal iso, and the image recording device 180 during driving.

The power supply 170 may further include the second battery 172 which is discharged by supplying power to the image recording device 180 upon parking or stopping of the vehicle 1 and which is charged by the starter 173 upon driving of the vehicle 1.

The second battery 172 may be a rechargeable battery.

The second battery 172 may supply power to the detector 140 provided in the airbag system 160 upon parking or stopping of the vehicle 1. The detector 140 provided in the airbag system 160 may include the second sensor 142 and the third sensor 143.

The second battery 172 may supply power to the first sensor 141, the fourth sensor 144, and the fifth sensor 145 upon parking or stopping of the vehicle 1.

The image recording device 180 may record a front image, a rear image, and left and right images for autonomous driving after ignition on.

The image recording device 180 may continue to photograph the surroundings and store the photographed images even after the ignition of the vehicle 1 is turned off so that the vehicle 1 is in a parked state.

The image recording device 180 may receive power for driving from any one of the second battery 172 and the starter 173.

For example, the image recording device 180 may receive power for driving from the starter 173 during driving of the vehicle 1, and receive power for driving from the second battery 172 during parking or stopping of the vehicle 1. The image recording device 180 may obtain and store an image by using power supplied from the starter 173 upon driving of the vehicle 1, and, upon parking or stopping of the vehicle 1, the image recording device 180 may obtain and store an image by using power supplied from the second battery 172.

When an amount of power generated by the generator is less than or equal to a reference amount of power in an ignition-on state of the vehicle 1, the vehicle 1 may supply power of the first battery 171 to the image recording device 180.

Also, when an amount of power transferred from the starter 173 is less than or equal to the reference amount of power during driving of the vehicle 1, the image recording device 180 may obtain and store an image by receiving power from the second battery 172.

When an ignition-on signal is received from the starter 173, the vehicle 1 may transfer power generated by the starter 173 to individual components of the image recording device 180.

More specifically, when power generated by the starter 173 is transferred to the image recording device 180, the vehicle 1 may convert the power generated by the starter 173 into a voltage and current required for driving of the image recording device 180, and then transfer power of the converted voltage and current to the individual components of the image recording device 180.

When an ignition-on signal is received from the starter 173, the vehicle 1 may control charging of the second battery 172, and also control charging of the first battery 171.

At least one component may be added or omitted to correspond to performances of the components of the vehicle 1 as illustrated in FIG. 4. Also, it will be readily understood by one of ordinary skill in the art that relative positions of the components may change to correspond to a performance or structure of a system.

The individual components illustrated in FIG. 4 mean a software and/or hardware component such as a field programmable gate array (FPGA) or an application specific integrated circuit (ASIC).

Figure 5:
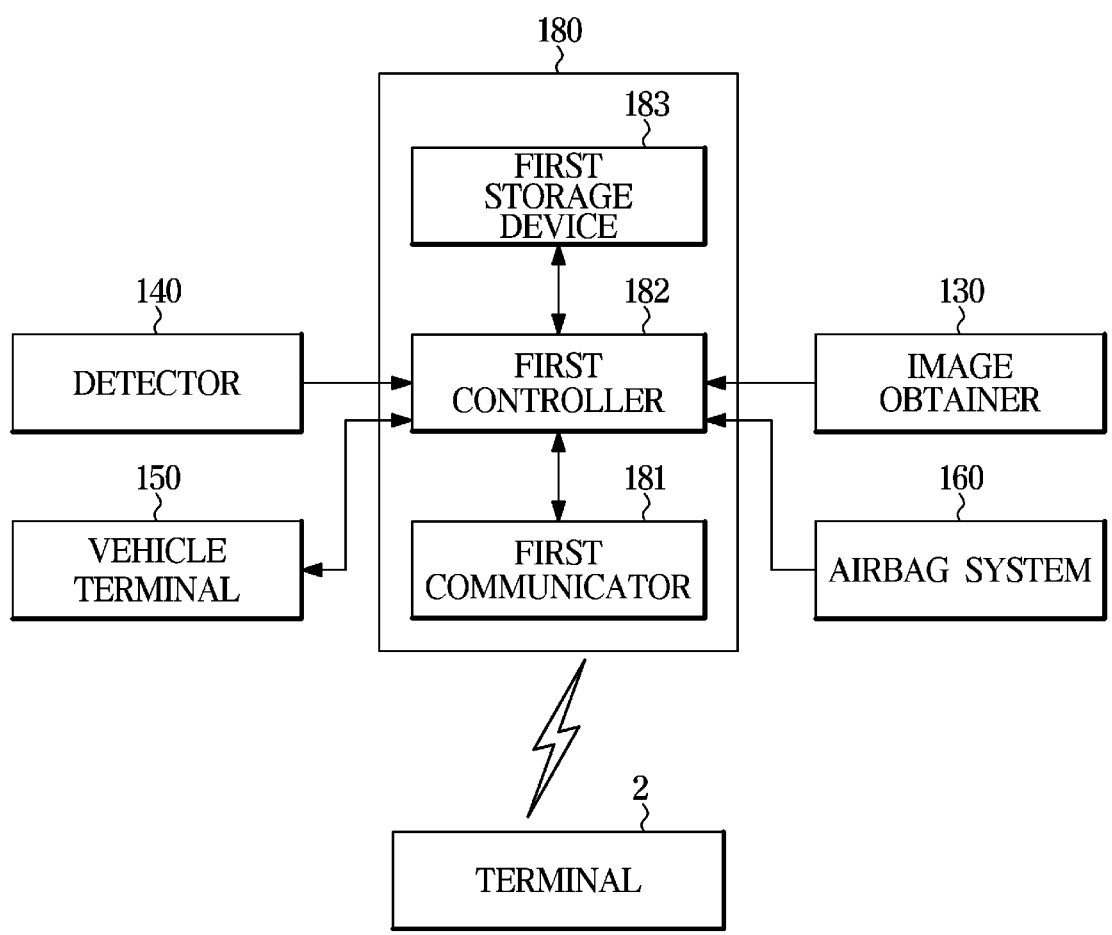
FIG. 5 is a control block diagram of an image recording device provided in a vehicle according to an embodiment.

FIG. 5 is a control block diagram of an image recording device provided in a vehicle according to an embodiment.

The image recording device 180 may include a first communicator 181, a first controller 182, and a first storage device 183.

The first communicator 181 may perform communications between various electronic devices provided in the vehicle 1 and the first controller 182. For example, the first communicator 181 may perform communications between the detector 140 and the first controller 182, between the airbag system 160 and the first controller 182, and between the vehicle terminal 150 and the first controller 182.

The first communicator 181 may perform communication with an external device, such as a server or a user terminal 2. The first communicator 181 may transmit an image stored in a first storage device 183 or an image obtained by the image obtainer 130 to the user terminal 2 in response to a control command from the first controller 182, and may transmit event information to the user terminal 2. The event information may include information about an event name, an event occurrence date, and an event location. The event name may include a door impact, a tail gate impact, a front panel impact, a rear panel impact, etc.

The user terminal 2 may be a terminal for a user, and the user terminal 2 may be implemented as a computer or a portable terminal that is connectable to the vehicle 1 through a network.

Herein, the computer may include, for example, a notebook computer with a WEB browser, a desktop computer, a laptop computer, a tablet PC, a slate PC, and the like, and the portable terminal, which is, for example, a wireless communication apparatus ensuring portability and mobility, may include all kinds of handheld-based wireless communication apparatuses, such as a personal communication system (PCS), global system for mobile communications (GSM), personal digital cellular (PDC), personal handyphone system (PHS), personal digital assistant (PDA), International Mobile Telecommunication (IMT)-2000, Code Division Multiple Access (CDMA)-2000, W-Code Division Multiple Access (W-CDMA), a wireless broadband internet (Wibro) terminal, a smart phone, and the like, and a wearable device, such as a watch, a ring, a bracelet, an anklet, a necklace, glasses, contact lenses, a head-mounted-device (HMD), etc.

The first communicator 181 may include one or more components enabling communications between external devices and various electronic devices provided in the vehicle 1, and may include at least one of, for example, a short-range communication module, a wired communication module, and a wireless communication model.

The short-range communication module may include various short-range communication modules, such as a Bluetooth module, an infrared communication module, a radio frequency identification (RFID) communication module, a wireless local access network (WLAN) communication module, a near field communication (NFC) module, a Zigbee module, etc., which transmit/receive signals in a short range through a wireless communication network.

The wired communication module may include various cable communication modules, such as a universal serial bus (USB), a high definition multimedia interface (HDMI), a digital visual interface (DVI), Recommended Standard232 (RS-232), power line communication (PLC), plain old telephone service (POTS), and the like, as well as various kinds of wired communication modules, such as a controller area network (CAN) communication module, a local area network (LAN) module, a wide area network (WAN) module, a value added network (VAN) module, and the like.

The wired communication module may further include a local interconnect network (LIN).

The wireless communication module may include wireless communication modules supporting various wireless communication methods, such as global system for mobile communication (GSM), Code Division Multiple Access (CDMA), Wideband Code Division Multiple Access (WCDMA), Universal Mobile Telecommunications System (UMTS), Time Division Multiple Access (TDMA), Long Term Evolution (LTE), and the like, as well as a Wireless Fidelity (WiFi) module and a wireless broadband module.

The first controller 182 may be connected to the starter 173 through the first communicator 181 or directly connected to the starter 173. The first controller 182 may receive an ignition-off signal or an ignition-on signal from the starter 173 through CAN or LIN communication.

When an ignition-on signal is received, the first controller 182 may terminate an image recording mode for parking and perform an image recording mode for driving. When the image recording mode for driving is performed, the first controller 182 may receive power from the starter 173.

When the image recording mode for driving is performed, the first controller 182 may block supply of power from the second battery 172 to the image recording device 180.

When an ignition-off signal is received from the starter 173, the first controller 182 may perform the image recording mode for parking. When the image recording mode for parking is performed, the first controller 182 may control the power supply 170 to transfer power of the second battery 172 to the individual components of the image recording device 180.

The image recording device 180 may include a first switch for controlling supply and cut-off of power between the first battery 171 and the second battery 172 and a second switch for controlling supply and cut-off of power between the starter 173 and the second battery 172. That is, the first controller 182 may control a switching operation of the first switch and the second switch to block power supplied to the individual components of the image recording device 180 or supply power to the individual components of the image recording device 180.

In the image recording mode for parking, the first controller 182 may monitor a charged state of the second battery 172, and compare an amount of charging of the second battery 172, corresponding to a result of the monitoring, with a reference amount of charging. When the amount of charging of the second battery 172 is less than or equal to the reference amount of charging, the first controller 182 may terminate the image recording mode for parking.

When the amount of charging of the second battery 172 is less than or equal to the reference amount of charging, the first controller 182 may receive power from the first battery 171.

The first controller 182 may perform image processing of at least one of image compression, image restoration, image improvement, image enlargement, image reduction, image rotation, image segmentation, object recognition, image matching, image correction, pre-processing, lightweight, and filtering on an image obtained from the image obtainer 130.

The first controller 182 may synthesize images obtained from the plurality of cameras to generate a top view image which a user can easily view, and control the display 152 to display the top view image. The images to be synthesized may be images obtained at the same time by a plurality of different cameras having different fields of view.

Also, the top view image may be an image obtained by matching images corresponding to information of objects located to the front, rear, left, and right of a symbol image of the vehicle 1. Herein, the images corresponding to the information of the objects may include symbol images of the objects corresponding to kinds of the objects, and further include tag images indicating additional information of the objects around the symbol images of the objects. The additional information may include at least one of speed information, location information, and number information of the objects.

When a command for reproducing a top view image is received through the input device 151, the first controller 182 may obtain a front image, a rear image, a left image, and a right image having time information input to the input device 151 from images stored in the first storage device 183, obtain information about an object and driving information having the time information, generate a top view image based on the obtained images, the information about the object, and the driving information, and control the display 152 to display the top view image.

When time information and a transmission command are received through the input device 151, the first controller 182 may search image information having the time information, and transmit the searched image information to the user terminal 2.

The first controller 182 may control recording of an image based on recording time information received by the input device 151. The first controller 182 may control an operation of the image obtainer 130 when recording of an image is controlled.

The first controller 182 may determine that recording time is an event, based on the recording time information. In this case, the first controller 182 may determine whether an impact has been applied to the vehicle 1, based on impact information detected by the detector 140. When the first controller 182 determines that an impact has been applied to the vehicle 1, the first controller 182 may control an operation of the image obtainer 130 to obtain an image about surroundings of the vehicle 1.

When the first controller 182 determines that an impact has been applied to the vehicle 1 while images are being recorded in a parked state of the vehicle 1, the first controller 182 may store an image recorded at time at which the impact has been applied, as an event image, among the images being recorded.

The first controller 182 may control communications with the airbag system 160 in a parked or stopped state of the vehicle 1. At this time, the first controller 182 may control communications with the second and third sensors 142 and 143 provided in the airbag system 160.

At this time, the first controller 182 may receive detection information detected by a plurality of second sensors 142 and a plurality of third sensors 143 provided in the airbag system 160 in a parked or stopped state of the vehicle 1. The detection information may include at least one of pressure information and acceleration information.

The first controller 182 may recognize a location at which the impact has been applied, based on detection information detected by the detector 140, determine a camera having a field of view including the recognized location, and control an operation of the determined camera.

The first controller 182 may check pressure information about pressure detected by the second sensor 142 provided in the left door, among the sensors of the detector 140, and determine whether the impact has been applied to the left door, based on the pressure information and reference pressure information. The reference pressure information may be second reference pressure information.

The first controller 182 may check acceleration information about acceleration detected by the third sensor 143 provided in the left door, among the sensors of the detector 140, and determine whether the impact has been applied to the left door, based on the acceleration information and reference acceleration information.

The first controller 182 may check pressure information about pressure detected by the second sensor 142 provided in the right door, among the sensors of the detector 140, and determine whether the impact has been applied to the right door, based on the pressure information and the reference pressure information.

The first controller 182 may check acceleration information about acceleration detected by the third sensor 143 provided in the right door, among the sensors of the detector 140, and determine whether the impact has been applied to the right door, based on the acceleration information and reference acceleration information. The reference acceleration information may be second reference acceleration information.

The fourth sensor 144 may be provided in the tail gate 116. In this case, the first controller 182 may check acceleration information about acceleration detected by the fourth sensor 144 among the sensors of the detector 140, and determine whether the impact has been applied to the tail gate 116, based on the acceleration information and the reference acceleration information.

The fifth sensor 145 may be provided in each of the left and right rear doors. In this case, the first controller 182 may check acceleration information about acceleration detected by the fifth sensor 145 provided in the right rear door, among the sensors of the detector 140, and determine whether the impact has been applied to the right rear door, based on the acceleration information and the reference acceleration information.

The first controller 182 may check acceleration information about acceleration detected by the fifth sensor 145 provided in the left rear door, among the sensors of the detector 140, and determine whether the impact has been applied to the left rear door, based on the acceleration information and the reference acceleration information.

When the first controller 182 determines whether an impact has been applied based on the checked pressure information and the reference pressure information, the first controller 182 may determine that pressure detected by the second sensor 142 is greater than or equal to the reference pressure, based on the checked pressure information and the reference pressure information. In this case, the first controller 182 may determine that an impact has been applied.

When the first controller 182 determines whether an impact has been applied based on the checked acceleration information and the reference pressure information, the first controller 182 may determine that acceleration detected by an acceleration sensor is the reference acceleration, based on the checked acceleration information and the reference acceleration information. In this case, the first controller 182 may determine that an impact has been applied. The acceleration sensor may be at least one of the first sensor 141, the third sensor 143, the fourth sensor 144, and the fifth sensor 145.

When the first controller 182 determines that an impact has been applied, the first controller 182 may recognize a location to which the impact has been applied in the vehicle 1, based on location information of a sensor that has detected impact information.

When the first controller 182 determines that impact information has been detected by the first sensor 141, the first controller 182 may recognize, as a location to which the impact has been applied, the front portion of the vehicle 1, and control an operation of the first camera 131 corresponding to the front portion of the vehicle 1. When the first controller 182 determines that impact information has been detected by the second sensor 142 provided in the left door, the first controller 182 may recognize, as a location to which the impact has been applied, the left portion of the vehicle 1, and control an operation of the third camera 133 corresponding to the left portion of the vehicle 1. When the first controller 182 determines that impact information has been detected by the second sensor 142 provided in the right door, the first controller 182 may recognize, as a location to which the impact has been applied, the right portion of the vehicle 1, and control an operation of the fourth camera 134 corresponding to the right portion of the vehicle 1.

The left portion of the vehicle 1 may be a door provided in the left side of the vehicle 1, and the right portion of the vehicle 1 may be a door provided in the right side of the vehicle 1.

Also, when the first controller 182 determines that an impact has been applied to the vehicle 1, the first controller 182 may control operations of all cameras provided in the vehicle 1.

When the first controller 182 determines that an impact has been applied to the vehicle 1, the first controller 182 may store image information about an image obtained by at least one camera.

When the first controller 182 determines that an impact has been applied to the vehicle 1, the first controller 182 may transmit information about an obtained image to a server or the user terminal 2 registered in advance. When the information about the obtained image is transmitted, the first controller 182 may transmit time information and location information together with the information about the obtained image. The user terminal 2 registered in advance may be a terminal registered by a user. The user terminal 2 may be a terminal of a user who is an owner of the vehicle 1 or a terminal of the user's acquaintance.

The server may be a telematics server of a vehicle manufacturing company, a server of a vehicle service center, a cloud server, or a web server.

The first controller 182 may primarily determine whether an impact has been applied to a side of the vehicle 1, based on acceleration information detected by the first sensor 141 among the sensors of the detector 140, and after the first controller 182 primarily determines that an impact has been applied to a side of the vehicle 1, the first controller 182 may secondarily determine whether an impact has been applied to a side of the vehicle 1 based on detection information detected by at least one second sensor 142 and at least one third sensor 143.

The first controller 182 may primarily determine whether an impact has been applied to a side of the vehicle 1, based on acceleration information detected by the first sensor 141 among the sensors of the detector 140, and when the first controller 182 determines that an impact has been applied to a side of the vehicle 1, the first controller 182 may determine which one of the left and right sides of the vehicle 1 the impact has been applied to, based on the acceleration information. Then, the first controller 182 may secondarily determine whether an impact has been applied to the side, based on detection information detected by the second sensor 142 and the third sensor 143 provided in the determined side.

The first controller 182 may determine whether at least one door has opened, based on detection information detected by an opening/closing detector (not shown) provided in each door. When the first controller 182 determines that the at least one door has opened, the first controller 182 may determine whether the impact applied to the vehicle 1 is an impact caused by door closing or an impact caused by another vehicle, based on the detection information. When the first controller 182 determines that the impact applied to the vehicle 1 is an impact caused by door closing, the first controller 182 may perform exception handling on impact information detected by the detector 140.

When the first controller 182 determines that the impact applied to the vehicle 1 is an impact caused by door closing, the first controller 182 may deactivate the image obtainer 130 to record no image.

When the first controller 182 determines that the impact applied to the vehicle 1 is an impact caused by door closing, the first controller 182 may not record an image obtained by the image obtainer 130 as an event image.

The first controller 182 may be configured with memory (not shown) to store an algorithm for controlling operations of the components in the vehicle 1 or data of a program for executing the algorithm, and a processor (not shown) to perform the above-described operations using the data stored in the memory. The memory and the processor may be implemented as separate chips or a single chip.

The first storage device 183 may store image information subject to image processing.

The first storage device 183 may store event image information about an event image.

The first storage device 183 may store user information. The user information may be a phone number and e-mail information, and include information of an application installed in a terminal.

The first storage device 183 may store location information about arrangement locations of the first, second, third, fourth, and fifth sensors 141, 142, 143, 144, and 145, or store location information about arrangement locations of the first, second, third, and fourth sensors 141, 142, 143, and 144.

The first storage device 183 may delete a stored image according to a control command from the first controller 182.

The first storage device 183 may store the reference pressure information and the reference acceleration information. The reference acceleration information may be the second reference acceleration information, and the reference pressure information may be the second reference pressure information.

The first storage device 183 may be implemented as at least one of a non-volatile memory device (for example, a cache, read only memory (ROM), programmable ROM (PROM), erasable programmable ROM (EPROM), electrically erasable programmable ROM (EEPROM), and flash memory), a volatile memory device (for example, random access memory (RAM)), and a storage medium (for example, a hard disk drive (HDD) and a compact disc read only memory (CD-ROM)), although it is not limited to these.

The first storage device 183 may be memory implemented as a separate chip from the processor described above in association with the first controller 182, or the first storage device 183 and the processor may be integrated into a single chip.

Figure 6:
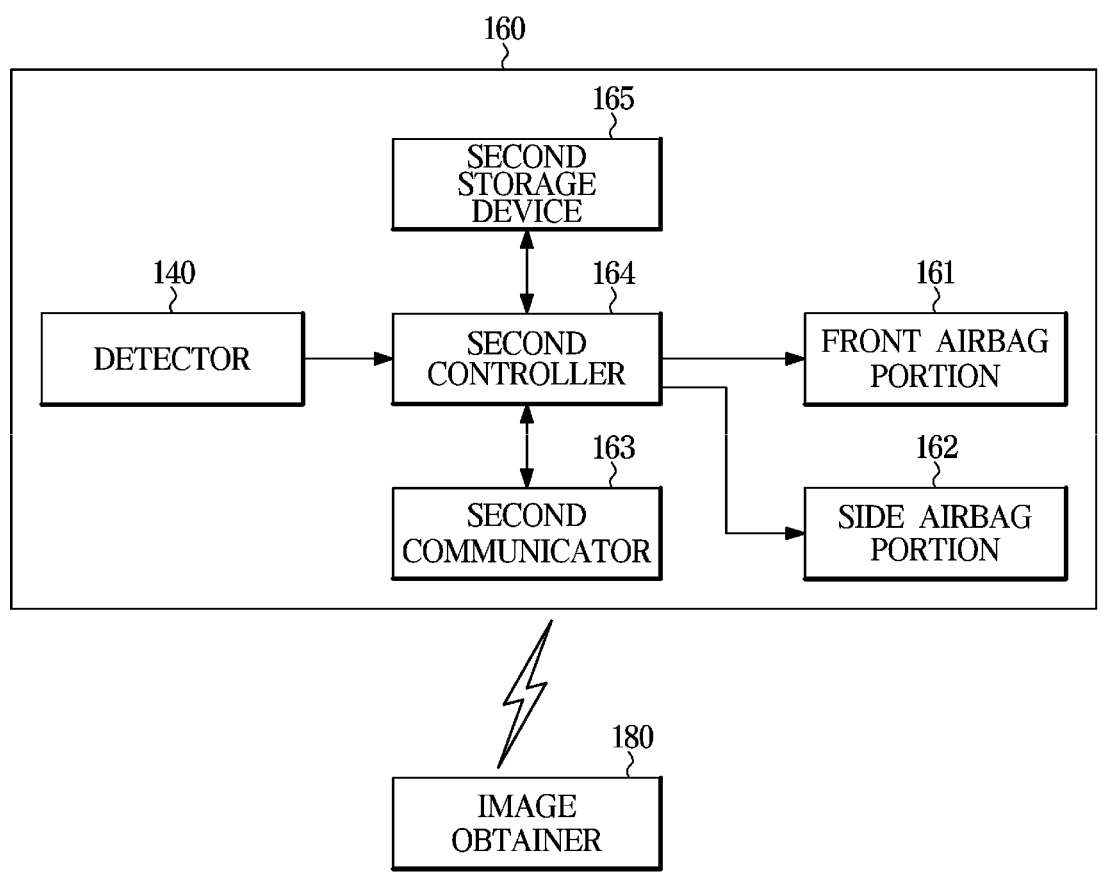
FIG. 6 is a control block diagram of an airbag system provided in a vehicle according to an embodiment.

FIG. 6 is a control block diagram of an airbag system provided in a vehicle according to an embodiment.

The airbag system 160 may include a second communicator 163, a second controller 164, and a second storage device 165, and may further include the detector 140.

To distinguish the second communicator 163, the second controller 164, and the second storage device 165 from the first communicator 181, the first controller 182, and the first storage device 183 of the image recording device 180, a communicator, a controller, and a storage device of the airbag system 160 will be referred to as the 'second' communicator 163, the 'second' controller 164, and the 'second' storage device 165.

The second communicator 163 may perform communications between various electronic devices provided in the vehicle 1 and the second controller 164. For example, the second communicator 163 may perform communications between the detector 140 and the second controller 164 and between the image recording device 180 and the second controller 164.

A configuration of the second communicator 163 may be the same as that of the first communicator 181, and therefore, descriptions thereof will be omitted.

The second controller 164 may receive power from a power supply during driving, and supply power for driving to internal configurations of the airbag system 160. The second controller 164 may receive power from the starter 173 or the first battery 171 of a driving power supply.

When it is determined that the vehicle 1 is in a parked or stopped state, the second controller 164 may supply power of the second battery 172 to the second sensor 142, the third sensor 143, and the second communicator 163.

When it is determined that the vehicle 1 is in a parked or stopped state, the second controller 164 may control the second communicator 163 to transmit detection information detected by the second sensor 142 and the third sensor 143 to the image recording device 180.

The second controller 164 may set reference information for determining whether to control deployment of the airbag portion during driving of the vehicle 1 to first reference information. Also, reference information for determining whether an impact has been applied during parking or stopping of the vehicle 1 may be second reference information.

Herein, the first reference information may include the first reference pressure information and the first reference acceleration information, and the second reference information may include the second reference pressure information and the second reference acceleration information.

The second controller 164 may determine, based on pressure information about pressure detected by the second sensor 142 during driving and the first reference pressure information, whether the pressure detected by the second sensor 142 is greater than or equal to the first reference pressure, and determine, based on acceleration information about acceleration detected by the third sensor 143 and the first reference acceleration information, whether the acceleration detected by the third sensor 143 is greater than or equal to the first reference acceleration. When the second controller 164 determines that the pressure detected by the second sensor 142 is greater than or equal to the first reference pressure and the acceleration detected by the third sensor 143 is greater than or equal to the first reference acceleration, the second controller 164 may control deployment of the front airbag portion 161 and the side airbag portion 162.

When the second controller 164 determines that the pressure detected by the second sensor 142 is greater than or equal to the first reference pressure or the acceleration detected by the third sensor 143 is greater than or equal to the first reference acceleration, the second controller 164 may control deployment of the front airbag portion 161 and the side airbag portion 162.

When it is determined that the vehicle 1 is in a parking or stopped state, the second controller 164 may control deactivation of the front airbag portion 161 and the side airbag portion 162.

When it is determined that the vehicle 1 is in a parking or stopped state, the second controller 164 may control the second communicator 163 to transmit detection information detected by at least one second sensor 142 and at least one third sensor 143 to the image recording device 180.

When it is determined that the vehicle 1 is in a parking or stopped state, the second controller 164 may set reference information for the second and third sensors 142 and 143 to second reference information, determine, based on pressure information about pressure detected by the second sensor 142 and the second reference pressure information, whether the pressure detected by the second sensor 142 is greater than or equal to the second reference pressure, transmit a first trigger signal to the image recording device 180 when the second controller 164 determines that the pressure detected by the second sensor 142 is greater than or equal to the second reference pressure, determine, based on acceleration information about acceleration detected by the third sensor 143 and the second reference acceleration information, whether the acceleration detected by the third sensor is greater than or equal to the second reference acceleration, and transmit a second trigger signal to the image recording device 180 when the second controller 164 determines that the acceleration detected by the third sensor 143 is greater than or equal to the second reference acceleration.

The second storage device 165 may store the first reference pressure information corresponding to the second sensor 142 and the second reference pressure information corresponding to the second sensor 142.

The second storage device 165 may also store the first reference acceleration information corresponding to the third sensor 143 and the second reference acceleration information corresponding to the third sensor 143.

For example, the first reference acceleration information which is a value for determining whether to deploy the airbag portion may be about 96 G, and the second reference acceleration information which is a value for determining whether an impact has been applied to the doors 115 may be about 0.5 G.

The first reference acceleration information may be acceleration information for deploying the airbag portion to protect a passenger from an impact applied to the vehicle 1.

The second reference acceleration information may be acceleration information corresponding to a degree of an impact at which the airbag portion does not need to be deployed although the impact is applied to the vehicle 1.

The second storage device 165 may be memory implemented as a separate chip from the processor described above in association with the second controller 164, or the second storage device 165 and the processor may be integrated into a single chip.

The second storage device 165 may be implemented as at least one of a non-volatile memory device (for example, a cache, ROM, PROM, EPROM, EEPROM, and flash memory), a volatile memory device (for example, RAM), and a storage medium (for example, HDD and CD-ROM), although it is not limited to these.

At least one component may be added or omitted to correspond to performances of the components of the airbag system 160 and the image recording device 180 as illustrated in FIGS. 5 and 6. Also, it will be readily understood by one of ordinary skill in the art that relative positions of the components may change to correspond to a performance or structure of a system.

Figure 7:
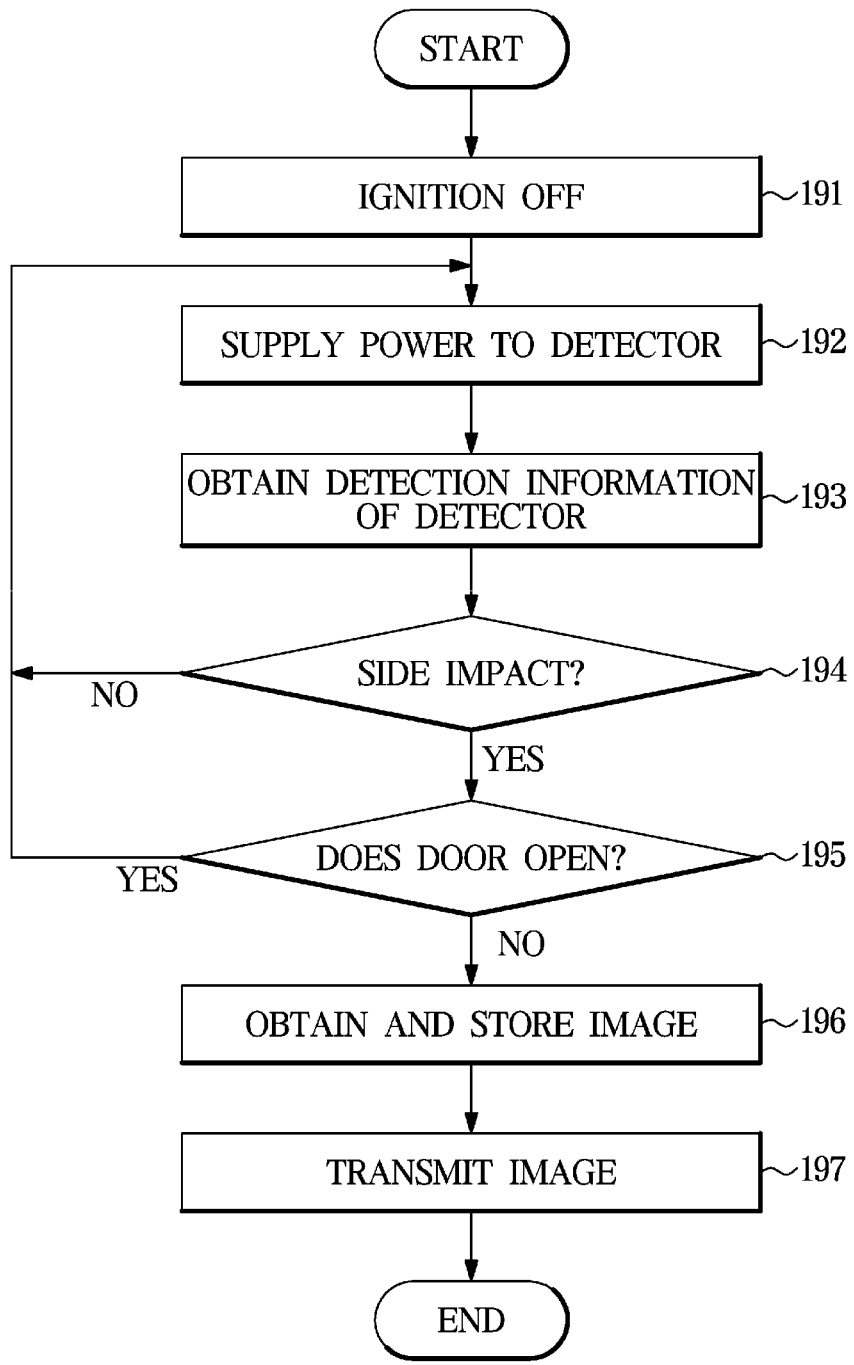
FIG. 7 is a control flow chart of a vehicle according to an embodiment.

FIG. 7 is a control flow chart of a vehicle according to an embodiment.

When the vehicle 1 starts, power may be supplied to the airbag system 160 and the image recording device 180.

During driving, the vehicle 1 may activate the image obtainer 130 to obtain and store images.

During driving, the vehicle 1 may perform image processing on an image obtained through at least one camera of the plurality of cameras to tune brightness, definition, colors, etc. of the image and remove noise from the image, and then store the image.

The vehicle 1 may determine whether an impact from an obstacle has been applied, based on impact information detected by the detector 140 during driving, and, when the vehicle 1 determines that an impact from an obstacle has been applied, the vehicle 1 may control an operation of the airbag system 160.

During driving, the vehicle 1 may set reference information for the second sensor 142 to the first reference pressure information, and set reference information for the third sensor 143 to the first reference acceleration information.

The vehicle 1 may determine, based on pressure information about pressure detected by the second sensor 142 during driving and the first reference pressure information, whether the pressure detected by the second sensor 142 is greater than or equal to the first reference pressure, determine, based on acceleration information about acceleration detected by the third sensor 143 and the first reference acceleration information, whether the acceleration detected by the third sensor 143 is greater than or equal to the first reference acceleration, and control deployment of the front airbag portion 161 and the side airbag portion 162 when the vehicle 1 determines that the pressure detected by the second sensor 142 is greater than or equal to the first reference pressure and the acceleration detected by the third sensor 143 is greater than or equal to the first reference acceleration.

Also, the vehicle 1 may control deployment of the front airbag portion 161 and the side airbag portion 162 when the vehicle 1 determines that the pressure detected by the second sensor 142 is greater than or equal to the first reference pressure or the acceleration detected by the third sensor 143 is greater than or equal to the first reference acceleration.

Meanwhile, when the vehicle 1 determines that the pressure detected by the second sensor 142 during driving is smaller than the first reference pressure and the acceleration detected by the third sensor 143 during driving is smaller than the first reference acceleration, the vehicle 1 may control maintenance of the front airbag portion 161 and the side airbag portion 162. That is, the vehicle 1 may control the front airbag portion 161 and the side airbag portion 162 not to be deployed.

When it is determined that the vehicle 1 is in a parked state by ignition off in operation 191, the vehicle 1 may supply power charged in the second battery 172 to the detector 140 and the image recording device 180, in operation 192. At this time, the vehicle 1 may supply power of the second battery 172 to the second and third sensors 142 and 143. In this case, the second and third sensors 142 and 143 may be electrically, mechanically, and communicatively connected to the image recording device 180.

Also, when it is determined that the vehicle 1 is in a parked state, the vehicle 1 may supply power charged in the second battery 172 to the airbag system 160. At this time, the vehicle 1 may supply power of the second battery 172 to the second and third sensors 142 and 143 of the airbag system 160, the second controller 164, and the second communicator 163.

A determination that the vehicle 1 is in a parked state may be made when at least one of a state in which driving speed is 0, a turned-on state of an electronic parking button, and a state in which a shift lever is in a parking position (P) is satisfied.

The vehicle 1, which is in a parked state, may set reference information for the second sensor 142 to the second reference pressure information and reference information for the third sensor 143 to the second reference acceleration information.

In the parked state, the vehicle 1 may obtain detection information of the detector 140, in operation 193, and determine whether an impact has been applied to a side of the vehicle 1, based on the detection information of the detector 140, in operation 194.

The detection information of the detector 140 may be impact information about an impact applied to the vehicle 1.

The impact applied to the side of the vehicle 1 may be an impact applied to a door of the vehicle.

The vehicle 1 may primarily determine whether an impact has been applied to a side of the vehicle 1, based on acceleration information detected by the first sensor 141 among the sensors of the detector 140.

More specifically, the vehicle 1 may check information about a direction in which an impact has been applied and information about the strength of the impact, based on acceleration information detected by the first sensor 141. When it is determined that the direction in which the impact has been applied is a side of the vehicle 1, based on the information about the direction in which the impact has been applied, the vehicle 1 may determine, based on the information about the strength of the impact and reference strength information, whether the strength of the impact applied to the vehicle 1 is greater than or equal to the reference strength. When the vehicle 1 determines that the strength of the impact applied to the vehicle 1 is greater than or equal to the reference strength, the vehicle 1 may primarily determine that an impact has been applied to the side of the vehicle 1.

The vehicle 1 may determine which one of a right side or a left side the impact has been applied to, based on direction information among the acceleration information detected by the first sensor 141.

Then, when the vehicle 1 primarily determines that the impact has been applied to the side of the vehicle 1, the vehicle 1 may secondarily determine whether an impact has been applied to the side of the vehicle 1, based on detection information detected by the second and third sensors 142 and 143 provided in the airbag system 160.

More specifically, when the vehicle 1 primarily determines that an impact has been applied to a left side of the vehicle 1, the vehicle may check pressure information about pressure detected by the second sensor 142 provided in the left door, among the sensors of the detector 140, and determine whether an impact has been applied to the left door based on the checked pressure information and the reference pressure information. The reference pressure information may be the second reference pressure information.

When it is determined that the pressure detected by the second sensor 142 is greater than or equal to the second reference pressure based on the checked pressure information and the reference pressure information, the vehicle 1 may determine that an impact has been applied to the left side of the vehicle. Herein, the left side of the vehicle 1 may be a driver seat door.

Also, when the vehicle 1 primarily determines that the impact has been applied to the left side of the vehicle 1, the vehicle may check acceleration information about acceleration detected by the third sensor 143 provided in the left door, among the sensors of the detector 140, and determine whether an impact has been applied to the left door, based on the checked acceleration information and the reference acceleration information.

When it is determined that the acceleration detected by the third sensor 143 is greater than or equal to the second reference acceleration based on the checked acceleration information and the reference acceleration information, the vehicle 1 may determine that an impact has been applied to the left side of the vehicle 1.

When the vehicle 1 primarily determines that an impact has been applied to the right side of the vehicle 1, the vehicle 1 may check pressure information about pressure detected by the second sensor 142 provided in the right door, among the sensors of the detector 140, and determine whether an impact has been applied to the right door, based on the checked pressure information and the reference pressure information.

That is, when it is determined that pressure detected by the second sensor 142 is greater than or equal to the second reference pressure based on the checked pressure information and the reference pressure information, the vehicle 1 may determine that an impact has been applied to the right side of the vehicle. Herein, the right side of the vehicle 1 may be a passenger seat door.

When the vehicle 1 primarily determines that an impact has been applied to the right side of the vehicle 1, the vehicle 1 may check acceleration information about acceleration detected by the third sensor 143 provided in the right door, among the sensors of the detector 140, and determine, based on the checked acceleration information and the reference acceleration information, whether an impact has been applied to the right door. Herein, the reference acceleration information may be the second reference acceleration information.

That is, when it is determined that the acceleration detected by the third sensor 143 is greater than or equal to the second reference acceleration based on the checked acceleration information and the reference acceleration information, the vehicle 1 may determine that an impact has been applied to the right side of the vehicle 1.

Also, when the vehicle 1 determines that an impact has been applied to the side of the vehicle, the vehicle 1 may determine whether the impact applied to the side of the vehicle 1 is an impact caused by opening/closing of a door, in operation 195.

At this time, the vehicle 1 may determine whether at least one door has opened, based on detection information of the opening/closing detector (not shown) provided in each door. When the vehicle 1 determines that at least one door has opened, the vehicle 1 may determine detection information of the detector 140 to be detection information detected by opening of at least one door, and perform exception handling of excluding the detection information detected by the detector 149 from an impact event.

The vehicle 1 may determine whether at least one door has been closed based on detection information of the opening/closing detector (not shown) provided in each door. When the vehicle 1 determines that the at least one door has been closed, the vehicle 1 may determine the detection information of the detector 140 to be detection information caused by closing of at least one door, and perform exception handling of excluding the detection information detected by the detector 140 from an impact event.

When exception handling of excluding the detection information detected by the detector 140 from an impact event is performed, the vehicle 1 may deactivate the image obtainer 130.

When exception handling of excluding the detection information detected by the detector 140 from an impact event is performed, the vehicle 1 may not store an image obtained by the image obtainer 130 as an event image.

When it is determined that the impact applied to the vehicle 1 is not an impact caused by opening or closing of a door based on the detection information of the opening/closing detector (not shown), the vehicle 1 may determine the detection information detected by the detector 140 to be impact information generated by an obstacle. That is, the vehicle 1 may determine that an impact has been applied to the vehicle 1.

When the vehicle 1 determines that an impact has been applied to the left side of the vehicle 1, the vehicle 1 may control an operation of the third camera 133 provided in the left side mirror 117 to obtain a left image, and store the obtained left image, in operation 196.

Figure 8:
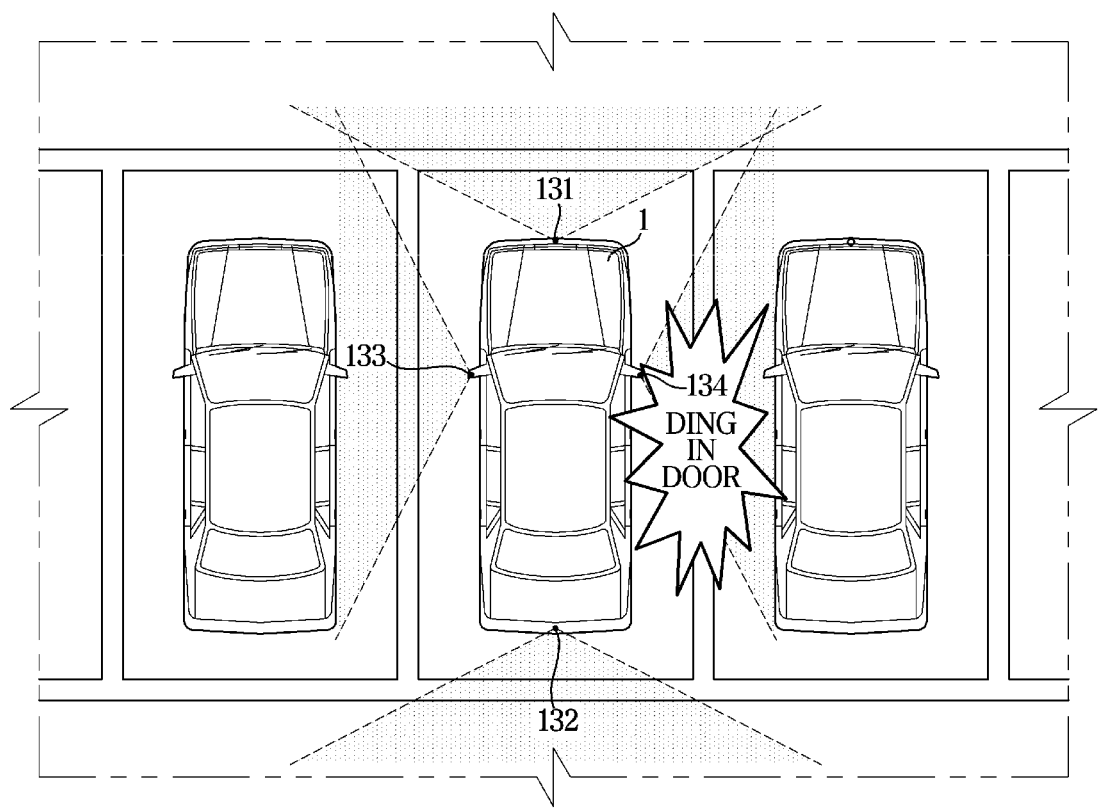
FIG. 8 illustrates an example of a situation in which an impact is applied to a vehicle according to an embodiment.

As illustrated in FIG. 8, when the vehicle 1 determines that an impact has been applied to the right side of the vehicle 1, the vehicle 1 may control an operation of the fourth camera 134 provided in the right side mirror 117 to obtain a right image, and store the obtained right image, in operation 196.

When the vehicle 1 determines that an impact has been applied to the vehicle 1, the vehicle 1 may transmit an obtained image to a server or the user terminal 2 registered in advance, in operation 197. When information about the obtained image is transmitted, the vehicle 1 may transmit time information and location information together with the obtained image. The user terminal 2 registered in advance may be a terminal registered by a user. The user terminal 2 may be a terminal of a user who is an owner of the vehicle 1 or a terminal of the user's acquaintance.

Also, when an impact is applied to the vehicle 1 which is in a parked state, the vehicle 1 may activate all of the plurality of cameras to obtain images captured in the front, rear, left, and right directions from the vehicle 1 as event images through the plurality of cameras, and transmit the obtained event images to the user terminal 2, thereby preventing another vehicle or person from damaging the vehicle 1 and then running away.

Meanwhile, the above-described embodiments may be embodied in the form of a recording medium to store commands executable by a computer. The commands may be stored in the form of program codes, and when executed by a processor, the commands can create a program module to perform operations of the embodiments. The recording medium may be embodied as a computer-readable recording medium.

The computer-readable recording medium may include all kinds of recording media storing commands that can be interpreted by a computer. For example, the computer-readable recording medium may be ROM, RAM, a magnetic tape, a magnetic disk, flash memory, an optical data storage device, or the like.

Embodiments of the disclosure may record, when a door of a parked or stopped vehicle is damaged by another vehicle, a surrounding image or an image of a location at which the damage has occurred to use the recorded image as base data related to occurrence of damage.

Embodiments of the disclosure may determine damage occurrence of a door by using sensors provided in another device, thereby overcoming a limitation in sensing damage occurrence of a door through a single acceleration sensor and preventing a rise in costs caused by a device for sensing an impact by an obstacle.

Embodiments of the disclosure may raise accuracy of a determination on an impact by distinguishing an impact caused by another vehicle from impacts caused by opening/closing of a door of a vehicle and opening/closing of a tail gate, thereby reducing frequent storage of images due to wrong sensing of impacts. Therefore, embodiments of the disclosure may efficiently use an image storage space of a storage device and reduce discharge of a battery. Accordingly, embodiments of the disclosure may increase image recording time for sensing an impact by an obstacle during parking.

Embodiments of the disclosure may improve marketability of a vehicle, further raise user satisfaction, improve user convenience and reliability, and ensure product competitiveness.

What is claimed is:

1. An image recording device comprising:
   an image obtainer configured to obtain image information;
   a first sensor configured to detect first impact information;
   a communicator configured to receive second impact information transmitted from another device, and to communicate with a terminal;
   a controller configured:
     to determine whether an impact has been applied to a side of a vehicle based on the first impact information and the second impact information,
     in response to a determination that the impact has been applied to the side of the vehicle, to determine whether the first impact information and the second impact information is information corresponding to opening/closing of at least one door of a plurality of doors of the vehicle, control deactivation of the image obtainer in response to a determination that the first impact information and the second impact information is the information corresponding to the opening/closing of the at least one door, control activation of the image obtainer in response to a determination that the first impact information and the second impact information is not the information corresponding to the opening/closing of the at least one door, and to control the communicator to transmit the image information obtained by the activation controlled image obtainer to the terminal; and
   a storage device configured to store the image information and event information in response to a control command from the controller.

2. The image recording device of claim 1, wherein:
   the first sensor comprises an acceleration sensor; and
   the second impact information includes pressure information detected by a second sensor provided in an airbag system or acceleration information detected by a third sensor provided in the airbag system.

3. The image recording device of claim 2, wherein:
   the controller is configured to primarily determine whether the impact has been applied to the side of the vehicle based on impact information detected by the first sensor; and
   in response to the controller primarily determining that the impact has been applied to the side of the vehicle, the controller is configured to secondarily determine whether the impact has been applied to the side of the vehicle based on the pressure information detected by the second sensor or the acceleration information detected by the third sensor.

4. A vehicle comprising:
   a plurality of doors;
   an image obtainer configured to obtain an image;
   a first sensor configured to detect a first acceleration;
   an airbag system comprising at least one of a second sensor configured to detect pressure from an impact or a third sensor configured to detect a second acceleration from the impact, the airbag system being configured to control deployment of an airbag portion in correspondence to the impact; and
   an image recording device configured to:
     record the image obtained by the image obtainer;
     determine whether the impact has been applied to a door of the plurality of doors based on detection information detected by the first sensor, the second sensor, and the third sensor in an ignition off state;
     in response to a determination that the impact has been applied to the door, store image information for the image obtained by the image obtainer; and
     transmit the image information to an external terminal,
   wherein:
     in a driving state, the airbag system is configured to set reference pressure information corresponding to the second sensor to first reference pressure information and reference acceleration information corresponding to the third sensor to first reference acceleration information, and
     in the ignition off state, the image recording device is configured to set the reference pressure information corresponding to the second sensor to second reference pressure information and the reference acceleration information corresponding to the third sensor to second reference acceleration information.

5. The vehicle of claim 4, wherein:
   the airbag portion comprises a side airbag portion installed in an interior of the vehicle and positioned adjacent to ones of the plurality of doors;
   the second sensor is positioned adjacent to a driver seat door and a passenger seat door among the plurality of doors; and
   the third sensor is positioned between a front door and a rear door among the plurality of doors and located inside B pillars respectively provided at left and right sides of a body of the vehicle.

6. The vehicle of claim 5, wherein the first sensor is positioned inside a hood of the body or a dashboard of the body.

7. The vehicle of claim 6, wherein the image recording device is configured to:
   primarily determine whether the impact has been applied to the door based on acceleration information about the first acceleration detected by the first sensor; and
   in response to primarily determining that the impact has been applied to the door, secondarily determine whether the impact has been applied to the door based on at least one of pressure information of the second sensor or acceleration information of the third sensor.

8. The vehicle of claim 4, wherein:
the image obtainer comprises a first camera configured to obtain a front image, a second camera configured to obtain a rear image, a third camera configured to obtain a left image, and a fourth camera configured to obtain a right image; and
the image recording device is configured to control activation of the first camera, the second camera, the third camera, and the fourth camera in response to the determination that the impact has been applied to the door.

9. The vehicle of claim 4, wherein:
the image obtainer comprises a first camera configured to obtain a front image, a second camera configured to obtain a rear image, a third camera configured to obtain a left image, and a fourth camera configured to obtain a right image; and
in response to the determination that the impact has been applied to the door, the image recording device is configured to store the image obtained for a preset period from a time at which the impact has been applied as an event image and transmit the event image to the external terminal.

10. The vehicle of claim 4, further comprising a battery configured to supply power to the image recording device and the second sensor and the third sensor positioned in the airbag system in the ignition off state.

11. The vehicle of claim 4, further comprising:
a tail gate; and
a fourth sensor positioned in the tail gate and configured to detect a third acceleration from the impact applied to the tail gate.

12. The vehicle of claim 4, wherein:
the plurality of doors includes a rear door positioned adjacent to a back seat; and
the vehicle further comprises a fifth sensor positioned in the rear door and configured to detect a third acceleration from the impact applied to the rear door.

13. The vehicle of claim 4, wherein the image recording device is configured to:
determine whether at least one door of the plurality of doors has opened;
determine whether detection information detected by the first sensor, the second sensor, or the third sensor is information corresponding to opening/closing of the at least one door based on the determination of whether the at least one door has opened; and
control deactivation of the image obtainer in response to the determination that the detection information detected by the first sensor, the second sensor, or the third sensor is the information corresponding to the opening/closing of the at least one door.

14. A vehicle comprising:
a communicator configured to communicate with an external terminal;
a plurality of doors;
an image obtainer configured to obtain an image;
a first sensor configured to detect a first acceleration;
an airbag system comprising a second sensor configured to detect a second acceleration from an impact, the airbag system being configured to control deployment of an airbag portion in response to the impact;
an image recording device configured to:
record the image obtained by the image obtainer;
determine whether the impact has been applied to a door of the plurality of doors based on detection information detected by the first sensor and the second sensor in an ignition off state;
store image information for the image obtained by the image obtainer in response to a determination that the impact has been applied to the door; and
transmit the image information to the external terminal; and
a battery configured to supply power to the image recording device and the second sensor positioned in the airbag system in the ignition off state, wherein the image recording device is configured to:
determine whether at least one door of the plurality of doors has opened,
determine whether the detection information detected by the first sensor and the second sensor is information corresponding to opening/closing of the at least one door based on a determination that the at least one door has opened, and
control deactivation of the image obtainer in response to a determination that the detection information detected by the first sensor and the second sensor is the information corresponding to the opening/closing of the at least one door.

15. The vehicle of claim 14, further comprising:
a tail gate; and
a third sensor positioned in the tail gate and configured to detect a third acceleration from the impact applied to the tail gate.

16. The vehicle of claim 14, wherein:
the plurality of doors comprises a rear door positioned adjacent to a back seat; and
the vehicle further comprises a fourth sensor positioned in the rear door and configured to detect a fourth acceleration from the impact applied to the rear door.

17. The vehicle of claim 14, wherein:
the image obtainer comprises a first camera configured to obtain a front image, a second camera configured to obtain a rear image, a third camera configured to obtain a left image, and a fourth camera configured to obtain a right image; and
in response to a determination that the impact has been applied to the door, the image recording device is configured to store the image obtained for a preset period from a time at which the impact has been applied as an event image and transmit the event image to the external terminal.

18. The vehicle of claim 14, wherein:
in a driving state, the airbag system is configured to set reference acceleration information corresponding to the second sensor to first reference acceleration information; and
in the ignition off state, the image recording device is configured to set the reference acceleration information corresponding to the second sensor to second reference acceleration information.

* * * * *